(12) United States Patent
Errington et al.

(10) Patent No.: US 7,886,815 B2
(45) Date of Patent: Feb. 15, 2011

(54) HVAC RESET LOGIC IMPROVEMENT FOR REAR CONTROL USABILITY

(75) Inventors: Bradley C. Errington, Bellefontaine, OH (US); Junichi Kanemaru, Upper Arlington, OH (US); Trevor Burns, Milford Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1030 days.

(21) Appl. No.: 11/677,381

(22) Filed: Feb. 21, 2007

(65) Prior Publication Data

US 2008/0196878 A1    Aug. 21, 2008

(51) Int. Cl.
B60H 1/00    (2006.01)
(52) U.S. Cl. .................... 165/203; 165/43; 165/202; 62/244; 62/115; 236/51; 237/12.3 A; 237/12.3 B
(58) Field of Classification Search ............ 165/42, 165/43, 44, 202, 203, 204; 62/115, 244; 237/12.3 A, 12.3 B; 236/51
See application file for complete search history.

(56) References Cited

U.S. PATENT DOCUMENTS

| | | | |
|---|---|---|---|
| 4,470,270 | A | 9/1984 | Takada et al. |
| 4,477,018 | A | 10/1984 | Rathgeber |
| 4,711,295 | A | 12/1987 | Sakurai |
| 4,901,788 | A | 2/1990 | Doi |
| 4,949,779 | A | 8/1990 | Kenny et al. |
| 5,086,628 | A | 2/1992 | Hashimoto |
| 5,279,459 | A | 1/1994 | Single, II |
| 5,647,223 | A * | 7/1997 | Wada et al. .................... 236/51 |
| 5,699,857 | A | 12/1997 | Flaishans et al. |
| 5,715,997 | A * | 2/1998 | Ito et al. ........................ 165/43 |
| 5,771,702 | A | 6/1998 | Kawai et al. |
| 5,833,133 | A | 11/1998 | Dage |
| 6,118,099 | A * | 9/2000 | Lake et al. ..................... 62/244 |
| 6,131,652 | A * | 10/2000 | Ito et al. .................. 237/12.3 A |
| 6,175,782 | B1 | 1/2001 | Obradovich et al. |
| 6,209,331 | B1 * | 4/2001 | Lake et al. ..................... 454/75 |
| 6,304,803 | B1 | 10/2001 | Dao |
| 6,397,942 | B1 * | 6/2002 | Ito et al. ...................... 165/204 |
| 6,460,356 | B1 | 10/2002 | Tao et al. |

(Continued)

FOREIGN PATENT DOCUMENTS

JP    58078819    5/1983

(Continued)

*Primary Examiner*—Ljiljana (Lil) V Ciric
(74) *Attorney, Agent, or Firm*—Mark E. Duell; Rankin Hill & Clark LLP

(57) ABSTRACT

A vehicle heating, ventilation, and air conditioning system includes front and rear HVAC systems. A controller receives data from front and rear control panels and controls the front and rear HVAC systems. Actuating a rear manual button on the front control panel allows control of the rear HVAC system via the rear control. Engine coolant temperature is used to judge if the vehicle has been inoperative for a long time. If the vehicle has not been inoperative for long, and the rear manual button was actuated prior to the vehicle shut down, rear manual control over the rear HVAC system is enabled. If the vehicle has been inoperative for a long time, or if the rear manual button was not actuated immediately prior to vehicle shut down, rear manual control is not enabled, thereby preventing operation of the rear HVAC system by the rear control panel.

7 Claims, 5 Drawing Sheets

U.S. PATENT DOCUMENTS

| | | | |
|---|---|---|---|
| 6,748,750 B2 * | 6/2004 | Choi | 62/115 |
| 6,758,265 B2 * | 7/2004 | Henry et al. | 165/203 |
| 6,923,012 B2 * | 8/2005 | Kurata et al. | 62/244 |
| 7,207,380 B2 * | 4/2007 | Henry et al. | 165/203 |

FOREIGN PATENT DOCUMENTS

| | | |
|---|---|---|
| JP | 58145540 | 8/1983 |

\* cited by examiner

HVAC RESET LOGIC IMPROVEMENT FOR REAR CONTROL USABILITY

BACKGROUND OF THE INVENTION

1. Field of the Invention

The present invention is generally directed toward vehicle heating, ventilation, and air conditioning control systems and, more specifically, toward such control systems.

2. Description of Related Art

Vehicle heating, ventilation, and air conditioning systems (hereafter HVAC systems) have conventionally included components and vents located in or around the dashboard. However, as is well known to anyone who has been in a vehicle having a conventional HVAC system, there is a significant difference in temperature between the front portion (hereinafter front cabin) and the rear portion (hereinafter rear cabin) of the cabin, especially on days with extreme conditions (hot, sunny days and cold days). Providing all of the vents at the front of the vehicle usually maintains uncomfortable temperature conditions for occupants in the rear cabin. Alternatively, if an effort is made to make the rear occupants comfortable, the front occupants are over-heated or over-cooled.

Accordingly, rear HVAC systems and controls in the rear cabin, which are in addition to the conventional front HVAC systems and controls in the front cabin, have been developed. Such vehicle HVAC control systems include parallel front and rear HVAC control panels connected to a controller.

In the conventional HVAC control system, the rear HVAC system is operable via input from either the rear control panel or the front control panel. The rear HVAC system can be controlled via input from the front control panel, but can only be controlled via input from the rear control panel when permitted by the front control panel through actuation of the rear manual button on the front control panel. When the rear manual button is not actuated, the rear HVAC system is controlled via input from the front control panel. However, when the rear manual button is actuated, the rear HVAC system is controlled via input from the rear control panel.

Further, with the conventional HVAC control system, the rear manual button on the front control panel is automatically de-actuated every time the vehicle is turned off. Accordingly, for the rear HVAC system to be controlled via input from the rear control panel, the rear manual button must be actuated by the front occupant every time the vehicle is started. This standard resetting procedure ensures that subsequent to restarting of the vehicle, occupants of the front cabin only intentionally relinquish control of the rear HVAC system to the rear control panel. Clearly, it is futile to give control of the rear HVAC system to the rear control panel if the rear cabin is unoccupied. Therefore, by de-actuating the rear manual button when the vehicle is turned off and thus deactivating the rear control panel, the rear HVAC system is not inadvertently controlled by the rear control panel after the vehicle is restarted. This is especially useful when there are no occupants in the rear cabin after the vehicle is restarted.

However, the foregoing conventional HVAC control system suffers from a number of disadvantages. For example, when occupants are still present in the rear cabin after the vehicle restart, the rear manual button must again be actuated to allow control of the rear HVAC system by input from the rear control panel. Having to actuate the rear manual button after every restart can be inconvenient for the front cabin occupant. Furthermore, waiting for the rear manual button to be actuated can be annoying for the rear cabin occupant.

Therefore, there exists a need in the art for a vehicle HVAC control system that provides rear occupants with improved control over the rear HVAC system.

SUMMARY OF THE INVENTION

The present invention is directed toward a device and method that selectively permits control over a rear HVAC system with a rear control panel subsequent to a vehicle restart.

More specifically, the present invention utilizes engine coolant temperature to determine if the vehicle has been inoperative for a long period of time. If the vehicle has been inoperative for only a short period of time, the rear control panel is permitted to continue controlling the rear HVAC system, if such action was allowed prior to the vehicle being turned off. Alternatively, if, based upon the coolant temperature, the vehicle is determined to have been inoperative for a long period of time, the rear control panel is prevented from controlling the rear HVAC system unless a rear manual button on a front control panel is actuated.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
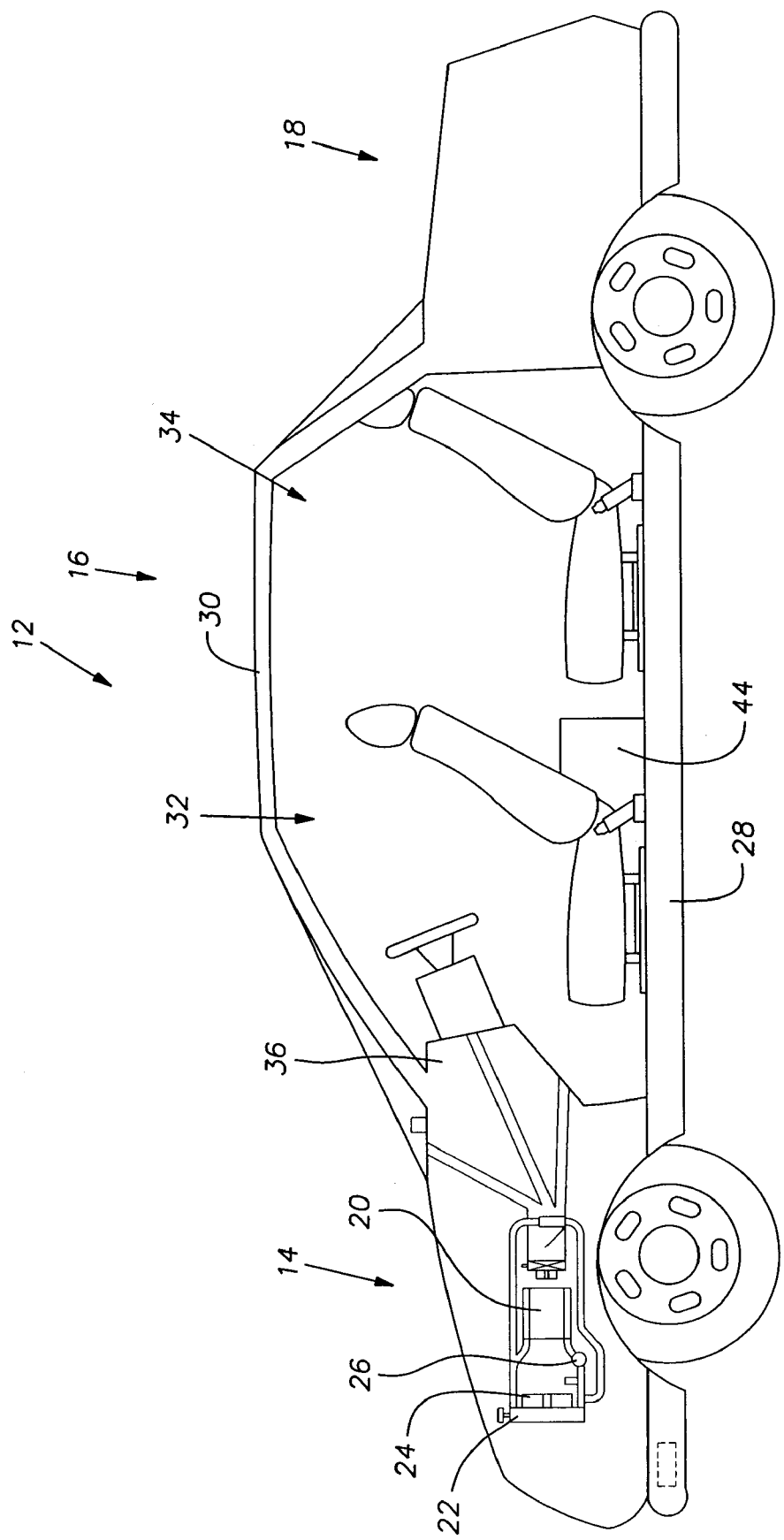
FIG. 1 is a side view of a vehicle with an HVAC control system of the present invention.
Figure 2:
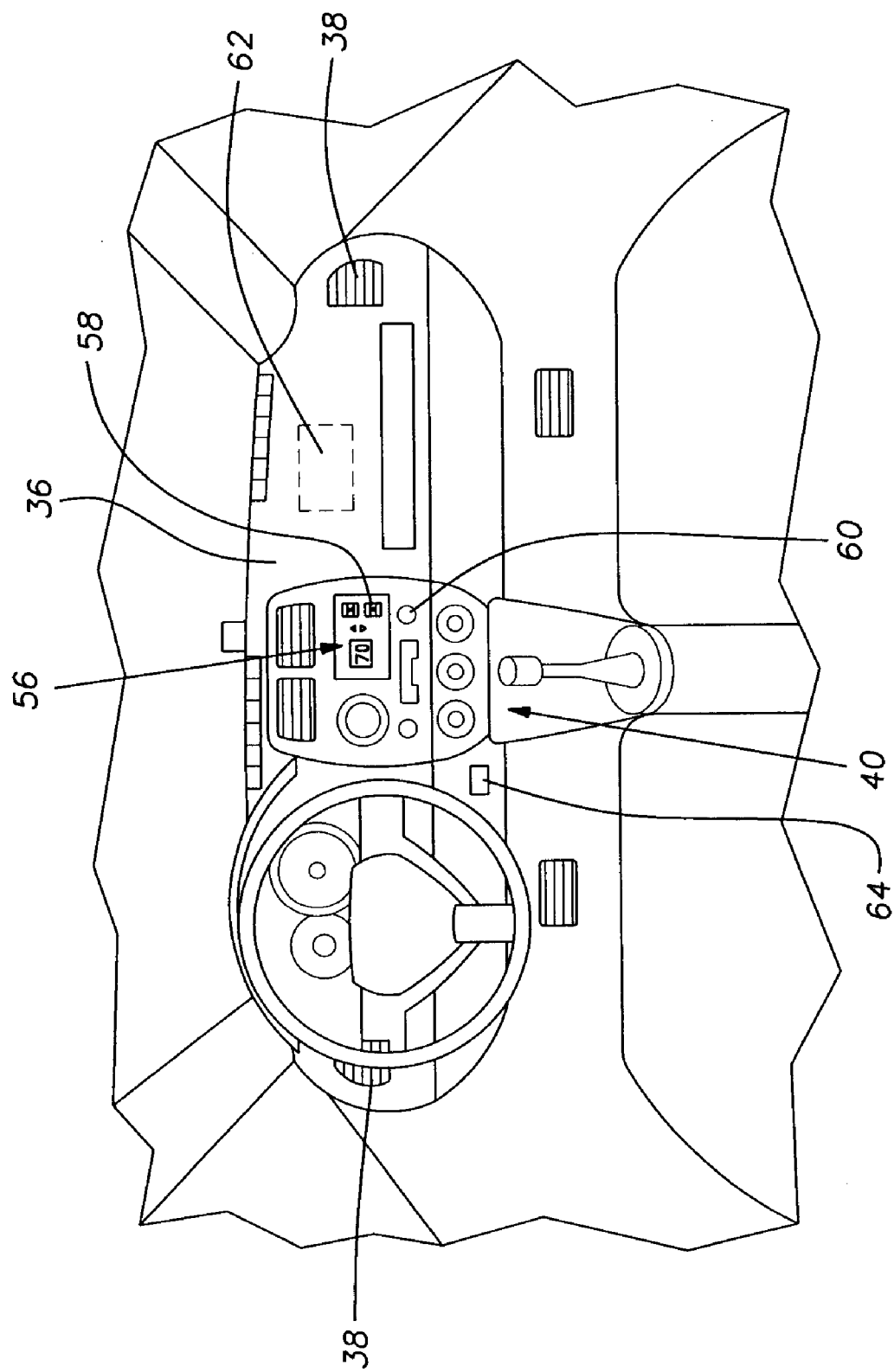
FIG. 2 is a perspective view of a front cabin of the vehicle of FIG. 1.
Figure 3:
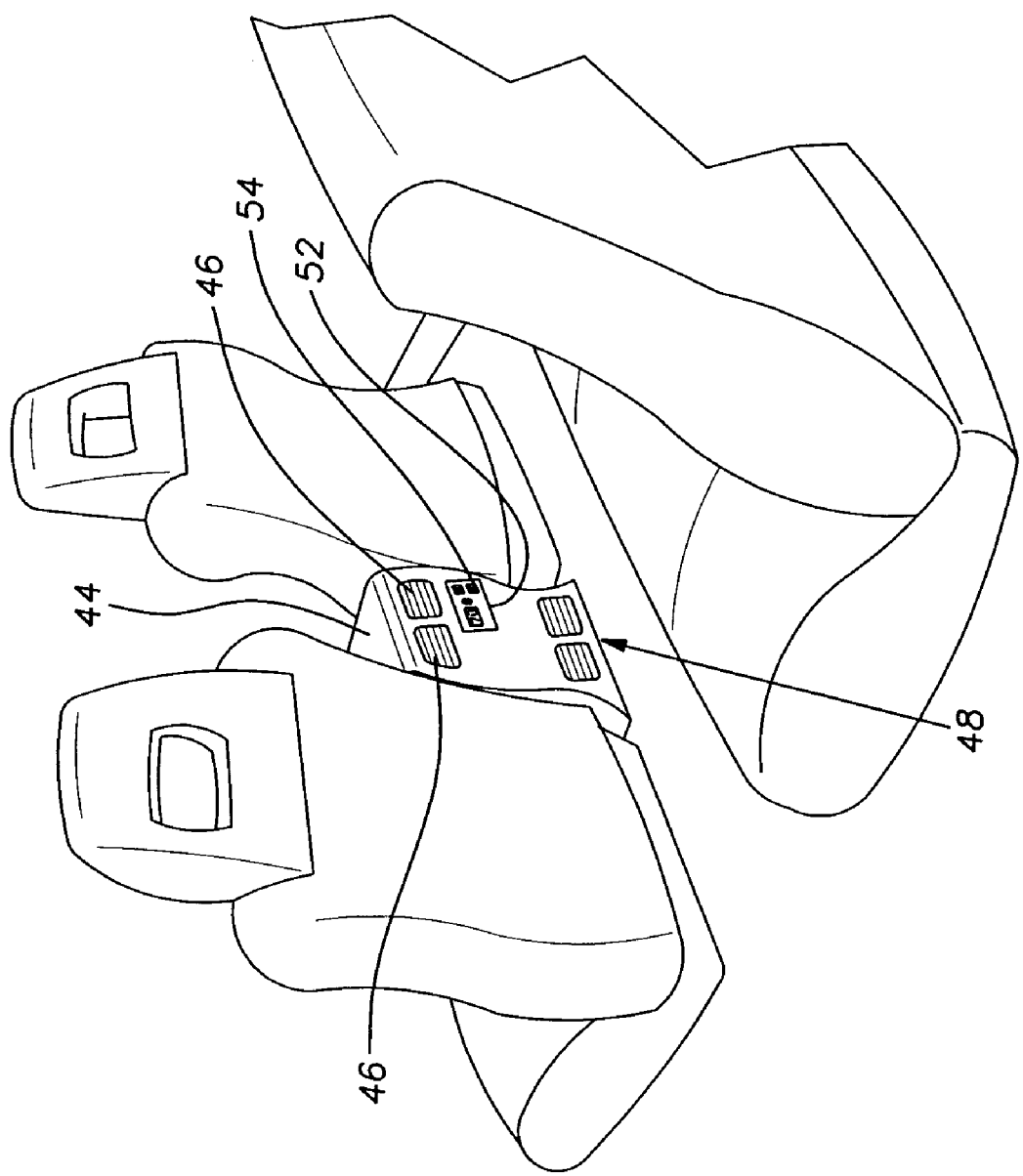
FIG. 3 is a perspective view of a rear cabin of the vehicle of FIG. 1.

With reference to FIGS. 1-4, an HVAC control system 10 for use in a vehicle 12 according to the present invention is shown. The vehicle 12 is comprised of three areas including an engine compartment 14, a cabin 16, and a storage compartment 18. An engine 20, a radiator 22, a radiator fan 24, and a coolant temperature sensor 26 are located in or around the engine compartment 14.

The cabin 16 is bounded by a floor 28, a roof 30, doors (not shown), the engine compartment 14, and the storage compartment 18. A front cabin 32 and a rear cabin 34 comprise the cabin 16. A dashboard 36, front outlets 38, a front control panel 40, and a front HVAC system 42 are located in the front cabin 32. A rear console 44, located in the rear cabin 34, includes rear outlets 46, a rear control panel 48, and optionally a rear HVAC system 50. Located on the rear console 44 are a rear temperature display 52 and a rear input device 54 for changing a rear set temperature ($T_{set-r}$).

For ease of understanding, since the rear HVAC system 50 is similar to the front HVAC system 42 in function and structure, several of the components of the rear HVAC system 50 are not illustrated. Moreover, insofar as the front and rear HVAC systems, apart from the improvements provided by the present invention, may be otherwise generally conventional, they are not described at length hereinafter. In this regard, should more information regarding front and rear HVAC systems be desired, reference should be made to U.S. Pat. No. 7,156,167 to Errington et al. and U.S. Pat. No. 6,304,803 to Dao, both assigned to Honda Giken Kogyo Kabushiki Kaisha, the entire disclosures of which are hereby expressly incorporated by reference into this application.

Located on the dashboard 36 are a temperature display 56, a front input device 58 for changing a front set temperature ($T_{set-f}$), a rear manual button 60, and the front outlets 38 for dispersing conditioned air. Optionally, the front control panel 40 can also display the rear set temperature ($T_{set-r}$). Further, the front input device 58 can be used to change the rear set temperature ($T_{set-r}$). Located in or behind the dashboard 36 is a controller 62, which is part of the control system 10. As is specifically shown in FIG. 4, the control system 10 also includes the coolant temperature sensor 26 and the cabin temperature sensor 64.

The coolant temperature sensor 26 and the cabin temperature sensor 64 are illustrated as being disposed at distinct locations in the engine compartment 14 and the front cabin 32. However, it is considered clear that other locations in the vehicle 12 also offer appropriate positions for placement of the sensors 26, 64. For example, the coolant temperature sensor 26 could be placed anywhere near where coolant flows that would allow accurate measurement of the coolant temperature ($T_w$). The coolant temperature sensor 26 is illustrated as being of a contact type, however use of non-contact measurement type devices is also envisioned.

Operation of the vehicle 12 causes the engine 20 to gain heat from the combustion process. As the engine 20 operates, the coolant circulates through the engine 20 and absorbs heat. When the coolant enters the radiator 22, the radiator fan 24 ensures that an adequate amount of air blows through the radiator 22 to sufficiently cool the coolant. Next, the coolant leaves the radiator 22 and enters the engine 20 to again absorb heat from the combustion process. It is noted that the coolant temperature ($T_w$) is measured with the coolant temperature sensor 26 after the coolant leaves the radiator 22. However, as previously disclosed, the coolant temperature ($T_w$) could be measured at a number of other locations.

In order to adjust air temperature in the front and rear cabins 32, 34, an occupant (not shown) changes the set temperature ($T_{set}$) on the temperature display 56 with the front input device 58. The set temperature ($T_{set}$) is communicated to the controller 62. In addition, the controller 62 receives the coolant ($T_w$) temperature from the coolant temperature sensor 26. Further, the rear manual button 60 status is sent to the controller 62. If the rear manual button 60 is actuated, the rear HVAC system 50 is controlled based upon the rear control panel 48. Alternatively, if the rear manual button 60 is not actuated, the rear HVAC system 50 is controlled based upon the front control panel 40. The status of the rear manual button 60 is stored in the controller 62, and is retained in the controller memory when the vehicle 12 is turned off, as will be apparent from the following discussion.

Figure 4:
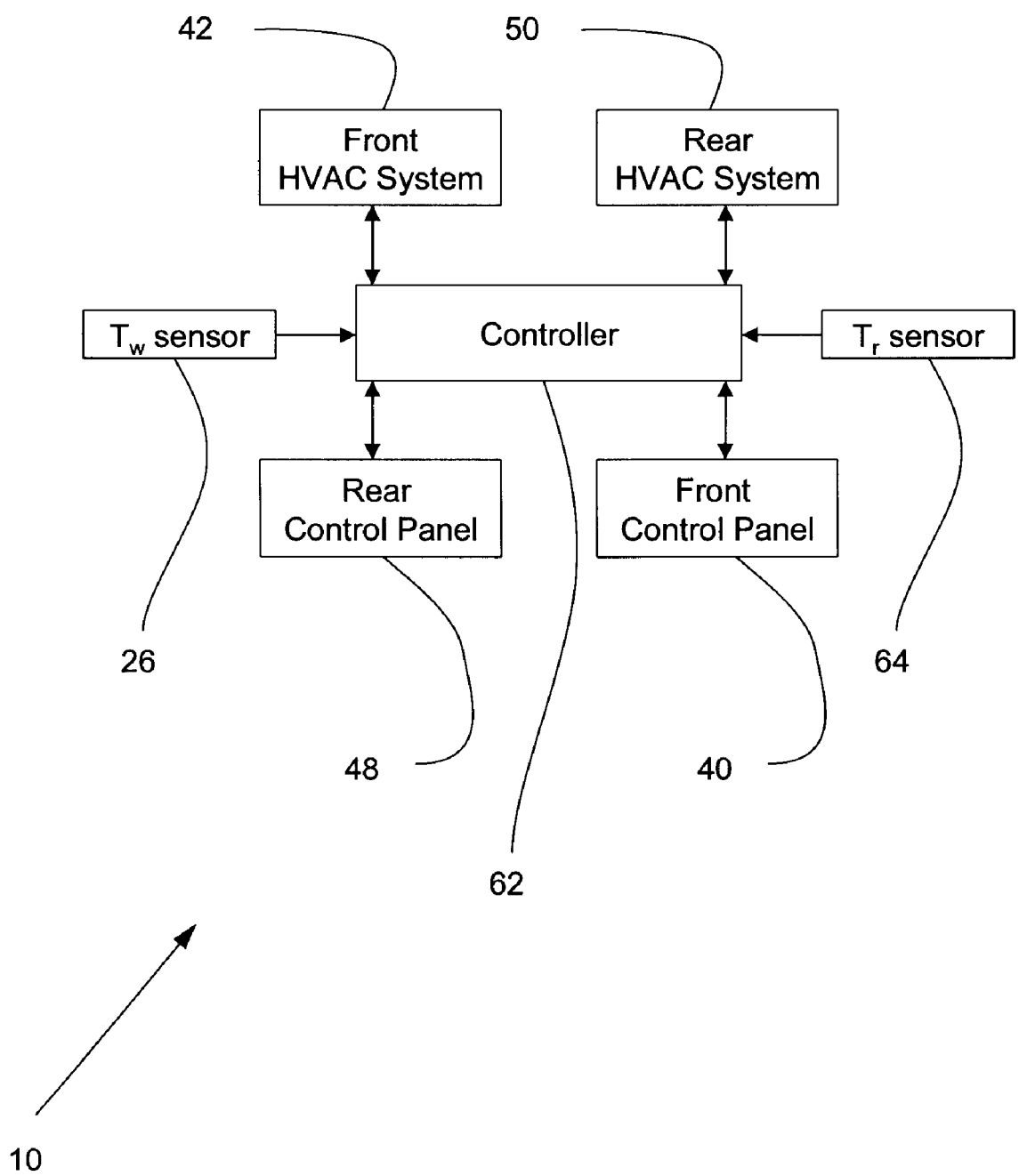
FIG. 4 is a schematic diagram illustrating the relationship between various components of the HVAC control system.

As shown in FIG. 4, the front and rear HVAC systems 42, 50, the front and rear control panels 40, 48, the cabin temperature sensor 64, and the coolant temperature sensor 26 are electrically connected to the controller 62. However, other means, such as for example wireless or fiber-optic communication means to connect the components with the controller 62, are possible and contemplated.

Further, although it is not preferred, it is considered apparent that air could be heated and cooled by the front HVAC system 42 and then separately ducted into the rear cabin 34 to practice the present invention.

As mentioned hereinbefore, the front and rear HVAC systems 42, 50 heat and cool the front and rear cabins 32, 34, respectively. If the rear manual button 60 is not actuated by the front occupant, the front and rear HVAC systems 42, 50 are operated based upon the settings from the front control panel 40. Alternatively, if the rear manual button 60 is actuated by the front occupant, the front and rear HVAC systems 42, 50 are operated based upon the settings from the front and rear control panels 40, 48, respectively.

Figure 5:
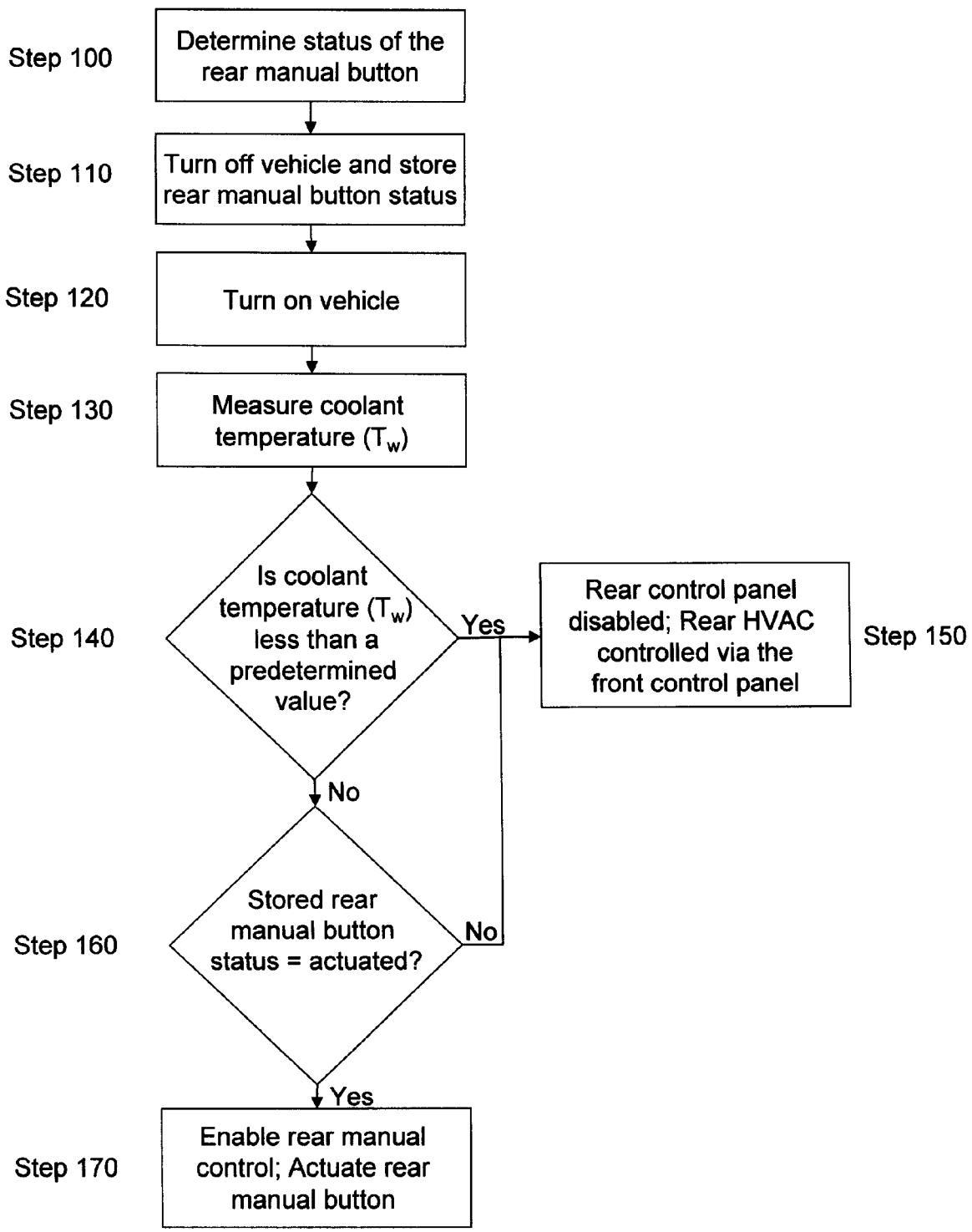
FIG. 5 is a flowchart illustrating a method according to the present invention.

A method of using the present invention is illustrated in FIG. 5. It is assumed that prior to Step 100, the vehicle is operating. In Step 100, the status of the rear manual button 60 is determined and stored in the controller 62. Then, the vehicle 12 is turned off and the status of the rear manual button 60 is maintained in the controller 62 (Step 110). In Step 120, the vehicle 12 is restarted. Then, the coolant temperature ($T_w$) is measured (Step 130). If the coolant temperature ($T_w$) is less than a predetermined temperature, the rear control panel 48 is disabled (i.e., rear manual control is not enabled; rear manual button status is 'off') and the rear HVAC system 50 is operated based upon the setting of the front HVAC system 42 (Steps 140, 150). If the coolant temperature ($T_w$) is greater than or equal to the predetermined temperature and the rear manual button 60 was previously actuated to provide control of the rear HVAC system 50 by the rear control panel 48 prior to the vehicle being turned off in Step 110, the rear HVAC system 50 is operated based upon the setting of the rear control panel 48 (Steps 160, 170) (i.e., rear manual control is enable; rear manual button status is 'on'). Alternatively, if the rear manual button 60 was not actuated prior to the vehicle being turned off in Step 110, the rear HVAC system 50 is operated based upon the setting of the front control panel 40 (Step 160, 150) (i.e., rear manual control is not enabled; rear manual button status is 'off').

Experimentally, it has been determined that many times a coolant temperature below the predetermined temperature of approximately 60° C. indicates that the vehicle 12 had been inoperative for a long period of time in most conditions. In this regard, a long period of time is any period of time greater than about 15-20 minutes, while a short period of time is any time less than or equal to about 15-20 minutes. However, other conditions could yield a different determination of what temperatures would indicate that the vehicle 12 has been inoperative for a long period of time and this is possible and contemplated.

The present invention teaches that when the coolant temperature ($T_w$) is less than 60° C. upon vehicle restart, the controller 62 disables rear manual control by de-actuating the rear manual button 60. However, when the coolant temperature ($T_w$) is greater than or equal to 60° C. upon vehicle restart, the setting of the rear manual button 60 prior to the vehicle 12 being turned off, either actuated or not actuated, is retained. Accordingly, if the rear manual button 60 was actuated prior to the vehicle 12 being turned off, the rear HVAC system 50 will be operated based upon the settings from the rear control panel 48 after restart. However, if the rear manual button 60 was not actuated prior to the vehicle 12 being turned off, the rear HVAC system 50 will be operated based upon the settings from the front control panel 40 after restart.

As previously described, with conventional HVAC systems, the rear manual button is automatically de-actuated every time the vehicle is turned off. Thus, in the conventional control arrangement, even if the vehicle is stopped for only a short period of time and then is restarted, occupants in the rear cabin cannot independently operate the rear HVAC system, unless the front occupant re-actuates the rear manual button. The present invention stores the rear manual button 60 status in the controller 62 and prevents the status of the rear manual button 60 from being reset when the vehicle 12 has only been inoperative for the short period of time, as determined by the temperature of the coolant ($T_w$). The rear occupant is therefore free to adjust the cabin temperature of the rear cabin 34, if such action was allowed prior to the vehicle restart. Accordingly, the front occupant is freed from having to continually actuate the rear manual button 60 after short stops. Also, the rear occupant can make adjustments to the climate in the rear cabin 34 without bothering the front occupant to request that the rear manual button 60 be actuated.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. An HVAC control system for a vehicle with front and rear HVAC systems, comprising:
   a coolant temperature sensor that senses engine coolant temperature;
   said front HVAC system include a front control panel that includes input devices that a user may manipulate in order to input control parameters, said front control panel including a rear manual switch that selectively enables rear manual control over the rear HVAC system:
   said rear HVAC system including a rear control panel that includes input devices to permit a rear user, when rear manual control is enabled via the rear manual switch on the front control panel, to control operation of the rear HVAC system; and,
   a controller that receives user inputs via the front and rear control panels as well as signals indicative of sensed conditions, including the measured engine coolant temperature, and controls operation of the front and rear HVAC systems;
   wherein, when the vehicle is shut off, the controller stores in memory a status of the rear manual switch and, wherein, when the vehicle is restarted, the controller accesses the status of the rear manual switch that is stored in memory and uses the rear manual switch status in conjunction with engine coolant temperature to determine whether to enable rear manual control via the rear control panel.

2. The HVAC control system of claim 1, wherein said controller is operable to selectively enable rear manual control over the rear HVAC system when the vehicle is restarted when the rear manual switch status stored in memory is actuated, which indicates that rear manual control was enabled when the vehicle was shut off, and when the sensed engine coolant temperature at restart is greater than a predetermined temperature.

3. The HVAC control system of claim 2, wherein the predetermined temperature is about 60° C.

4. The HVAC control system of claim 1, wherein the controller disables rear manual control over the rear HVAC system when the rear manual switch status stored in memory is deactuated, which indicates that rear manual control was disabled when the vehicle was shut off, or when the engine coolant temperature is less than a predetermined temperature.

5. The HVAC control system of claim 4, wherein the predetermined temperature is about 60° C.

6. A method for operating a vehicle with front and rear HVAC systems to selectively enable rear manual control over the rear HVAC system when the vehicle is restarted after a period of non-operation, comprising the steps of:
   turning on the vehicle;
   retrieving from memory a status information indicating whether a rear manual switch was either actuated or deactuated immediately prior to the period of non-operation; and
   measuring engine coolant temperature;
   wherein, when the engine coolant temperature is greater than or equal to a predetermined temperature and the retrieved status information is indicative of the rear manual button being actuated immediately prior to the period of non-operation, enabling rear manual control of the rear HVAC system;
   and wherein, when the engine coolant temperature is less than the predetermined temperature, disabling rear manual control of the rear HVAC system.

7. The method of claim 6, wherein the predetermined temperature is about 60° C.

\* \* \* \* \*